Feb. 11, 1958 G. W. TRUNDLE 2,822,922
SEPARATOR FOR SAND AND GRAVEL
Filed Sept. 23, 1955 3 Sheets-Sheet 1
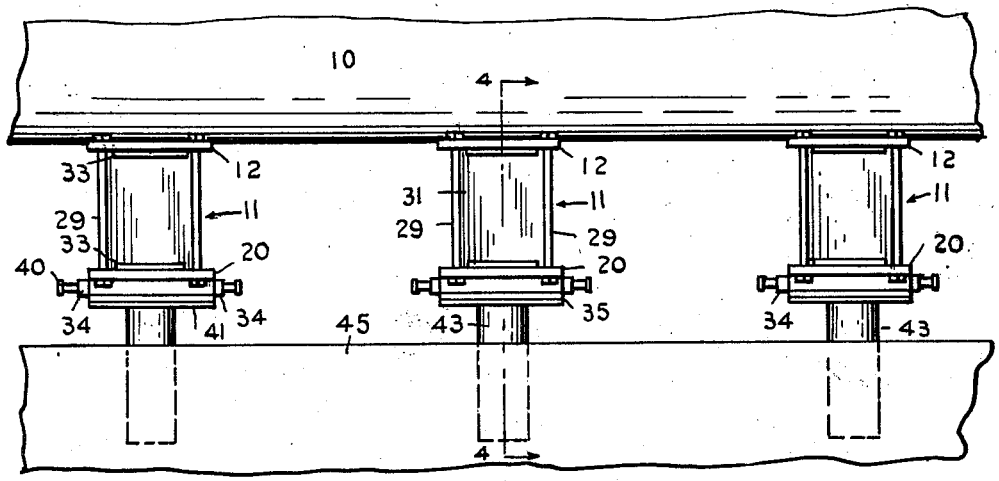
Fig. 1.
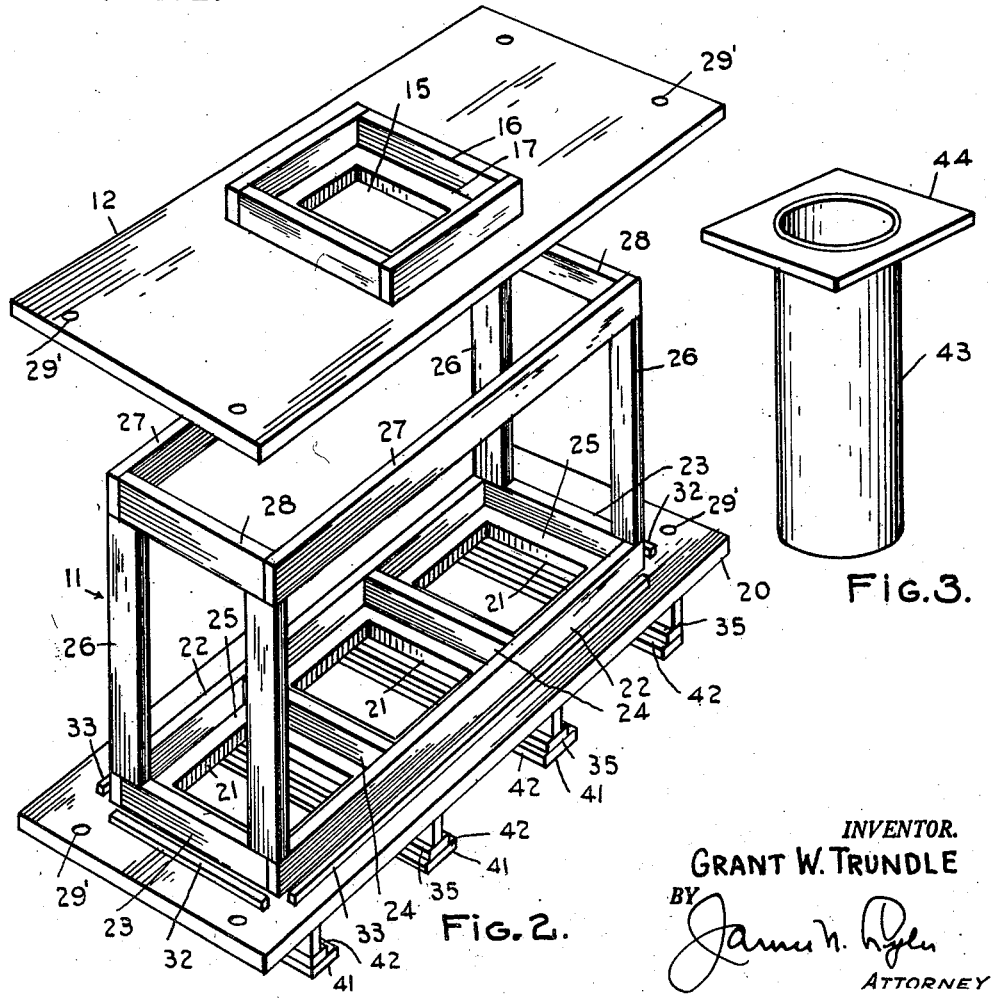
Fig. 2.
Fig. 3.
INVENTOR.
GRANT W. TRUNDLE
BY
ATTORNEY

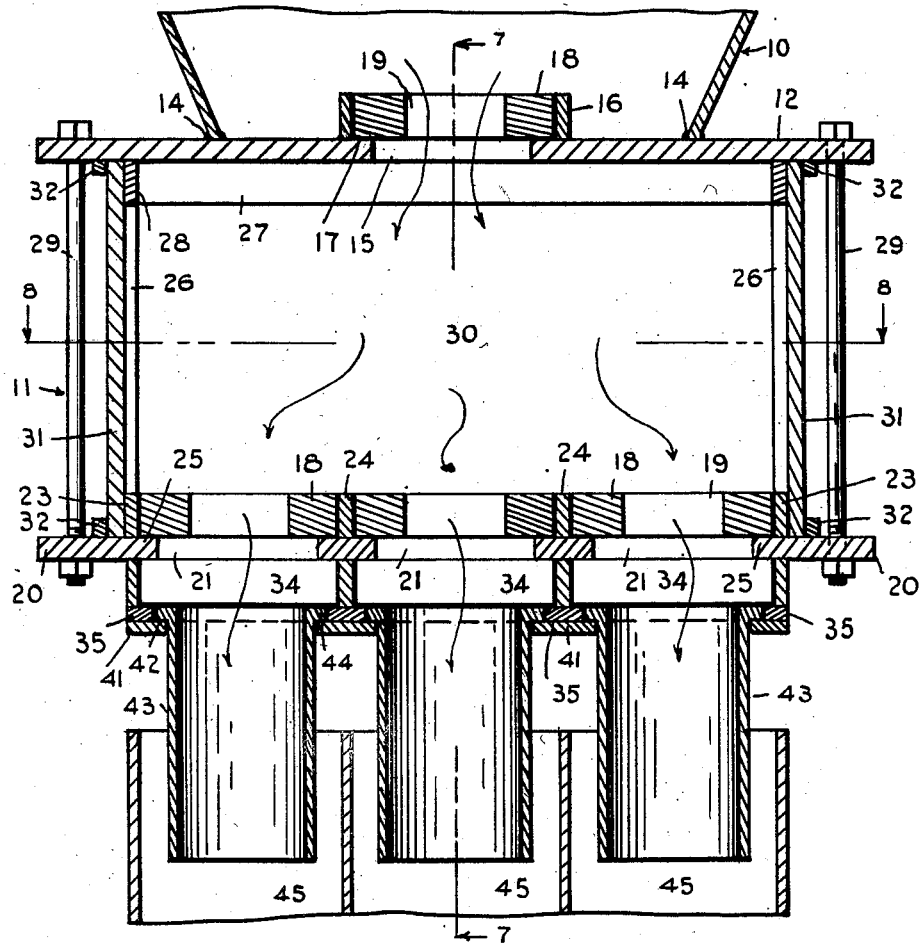
Fig. 4.
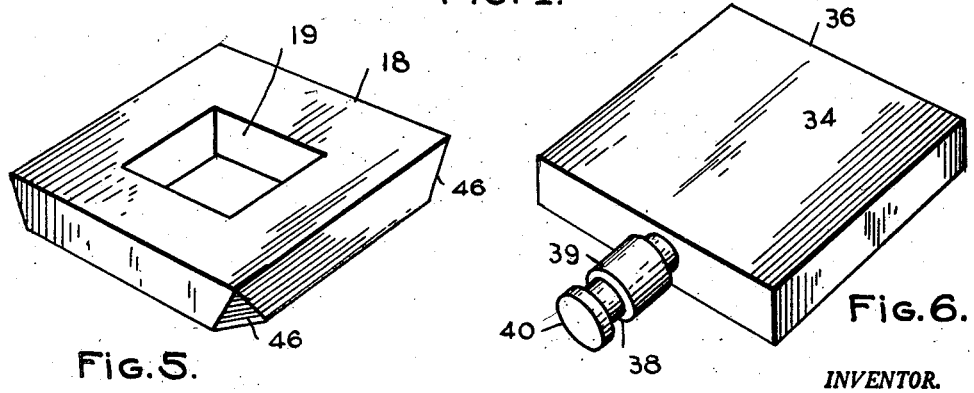
Fig. 5.    Fig. 6.
INVENTOR.
GRANT W. TRUNDLE,
BY
ATTORNEY

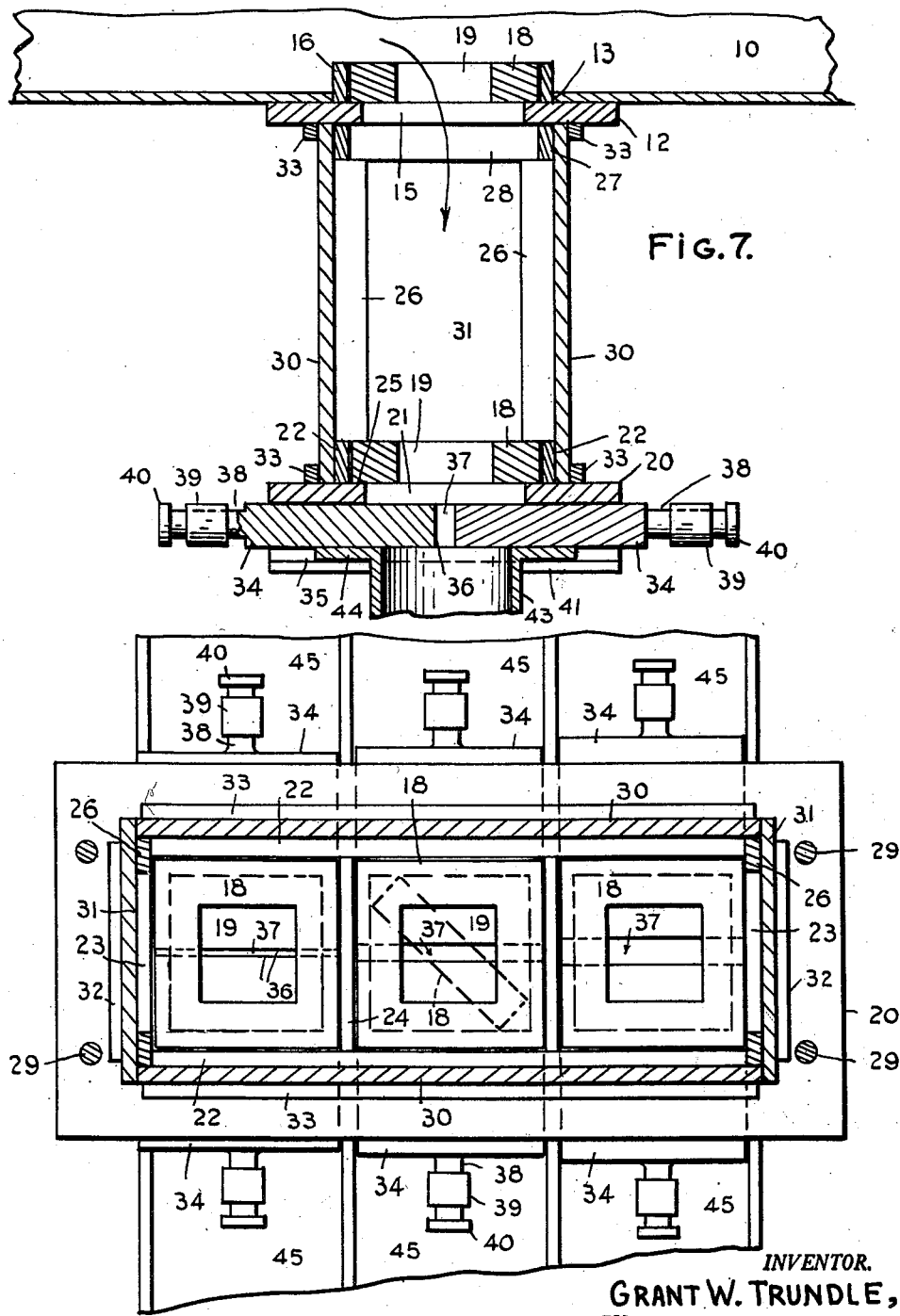

United States Patent Office 2,822,922
Patented Feb. 11, 1958

2,822,922

SEPARATOR FOR SAND AND GRAVEL

Grant W. Trundle, Fort Lauderdale, Fla.

Application September 23, 1955, Serial No. 536,112

11 Claims. (Cl. 209—97)

The present invention relates to a separator for crushed stone components such as concrete aggregates, sand and waste sludge, and the like.

A primary object of the invention is to provide separator apparatus for receiving the crushed stone with water from a crushing apparatus for separating the desired components or aggregates and waste sludge which flows to the separator apparatus through a common flume or trough.

Another object of the invention is to provide a separator of the above-mentioned character in which parts which are subjected to great wear, due to the abrasive action of the aggregates are readily removable or reversible without necessitating the dismantling of the apparatus.

A further object is to provide separator apparatus for crushed stone aggregates, and the like, which is compact and simplified in construction, rugged and durable and capable of indefinite usage.

Still another object is to provide apparatus of the above-mentioned character which is very easy to assemble, disassemble and maintain.

Other objects and advantages of the invention will be apparent during the course of the following description.

In the accompanying drawings, forming a part of this application, and in which like numerals are employed to designate like parts throughout the same, Figure 1 is a side elevation of separator apparatus embodying the invention, Figure 2 is an exploded perspective view of a single separator unit of the apparatus removed, with parts omitted, Figure 3 is a perspective view of a discharge spout employed with each separator unit, Figure 4 is a transverse vertical section taken on line 4—4 of Figure 1, on an enlarged scale, Figure 5 is an enlarged perspective view of a removable liner employed with each separator unit, Figure 6 is a similar view of a removable valve plate employed with each separator unit, Figure 7 is a vertical section taken on line 7—7 of Figure 4, parts broken away, and, Figure 8 is a horizontal section taken substantially on line 8—8 of Figure 4.

In the drawings, where for the purpose of illustration is shown a preferred embodiment of the invention, the numeral 10 designates a horizontal flume or trough for conveying the crushed stone aggregates mixed with water from a conventional stone crusher, not shown, to the separator apparatus of the present invention.

The separator apparatus proper preferably comprises a plurality of separate separator units 11, preferably 3 or more in number, as shown in the drawings depending from the bottom of the flume 10 in spaced apart relation longitudinally of the flume or trough. It should be understood that the flume 10 may be made any desired length, and that any desired number of the separator units 11 may be employed with the flume, as found practical.

Each separator unit 11 comprises an upper horizontal rigid rectangular plate 12 which is elongated somewhat transversely of the flume 10 and underlying the flume, as shown. Adjacent each plate 12, the flume 10 is provided in its bottom with a large rectangular opening 13, and this opening is covered by the plate 12 which engages the bottom of the flume 10 and is rigidly secured thereto by welding or the like about the margin of the opening 13, as indicated at 14, Figure 4. Thus, at each opening 13 in the bottom of the flume 10, the water and crushed stone flow over the tops of the upper plates 12 which are well adapted to withstand the wear due to abrasion caused by the crushed stone. The separator units 11 are thus individually rigidly secured to the flume 10 through the upper plates 12 which are permanently secured to the bottom of the flume by welding.

Each upper plate 12 is provided centrally with a single relatively large rectangular opening 15, surrounded by a low upstanding rectangular wall 16, preferably formed of individual bars welded to the top of the plate 12 and spaced somewhat outwardly of the marginal edges of the opening 15 for forming a rectangular ledge 17 between the opening 15 and wall 16, as shown.

Disposed within the socket formed by the wall 16 and ledge 17 of each unit 11 is a rectangular liner plate 18 which is readily removable. The liner plate 18 has a central rectangular opening 19 formed therethrough, somewhat smaller than the opening 15 and leading to the opening 15, as shown. The removable liner 18 rests upon the ledge 17 and is held centered by the rectangular wall 16, and the liner is readily liftable or removable from its socket, as stated.

Each separator unit 11 further comprises a lower horizontal rigid rectangular plate 20 of substantially the same overall dimensions as the upper plate 12. Each lower plate 20 is provided with three rectangular openings 21, preferably of the same size as the opening 15 and spaced apart equidistantly, longitudinally of the lower plate 20 and transversely of the flume 10. Each lower plate 20 is further provided with a pair of low upstanding parallel longitudinal bars 22 and a pair of parallel transverse upstanding bars 23, rigidly secured by welding to the top of the lower plate 20, and the bars 22 and 23 are spaced somewhat outwardly of the margins of the rectangular openings 21, as best shown in Figure 2, for forming a rectangular low upstanding wall surrounding the three openings 21. Additional transverse parallel separator bars 24 are welded to the top of each plate 20 between the central and endmost openings 21, and the separator bars 24 preferably have their ends welded to the inner sides of the bars 22. It is thus seen that the bars 22, 23 and 24 form about the openings 21 rectangular sockets haivng bottoms or ledges 25 corresponding to the ledges 17 previously described. The sockets thus formed above each rectangular opening 21 are adapted to receive the removable rectangular liners 18 previously described in connection with the upper plates 12. The three liners 18 on each lower plate 20 have their reduced openings 19 in registry with the openings 21, in the same manner that the liner 18 of each upper plate 12 has its opening 19 in registry with the opening 15. The tops of all of the liners 18 are preferably flush with the tops of the bars or walls 16, 22, 23 and 24, as shown in Figure 4. The liners 18 upon the lower plates 20 are readily liftable or removable from their rectangular sockets, as will be further discussed hereinafter.

Each unit 11 further embodies a rigid frame including vertical legs 26 having their lower ends rigidly secured by welding to the top of the rectangular wall surrounding the openings 21, Figure 2. The legs 26 are preferably located at the four corners of the wall formed by bars 22 and 23, Figure 2. Rigidly secured by welding or the like to the tops of the legs 26 are longitudinal and transverse horizontal frame members or bars 27 and 28, the ends of these longitudinal and transverse frame bars being preferably welded together. As shown in Figures 4 and 7, the upper sides of the frame bars 27 and 28 abut the bottoms of the upper plates 12 in each assembled unit 11, the frame serving to maintain the upper and lower plates 12 and 20 of each unit 11 spaced apart vertically in parallel superposed relation.

The upper and lower plates 12 and 20 of each unit 11 are rigidly connected in assembly by long vertical bolts 29 engaging through openings 29' formed through the plates 12 and 20 near the four corners of the same. The lower plate 20 and associated elements of each unit 11 are thus suspended from the upper plate 12 through the medium of the bolts 29, and the rigid frame comprising legs 26 and bars 27 and 28 serves to space the upper and lower plates 12 and 20 in assembly.

Removable side and end vertical closure panels 30 and 31 are provided between the upper and lower plates 12 and 20 of each unit 11, and these closure panels slidably engage the outer sides of the frame constituted by the legs 26 and bars 27 and 28, Figures 4 and 7. To prevent sidewise displacement of the panels 30 and 31, rails or strips 32 and 33 are welded or otherwise rigidly secured to the bottom and top respectively of the plates 12 and 20 of each unit 11. The rails 32 and 33 are spaced slightly outwardly of the sides of the frame 26—27—28, so as to be slidably engaged by the vertical panels 30 and 31. The arrangement is such that the pairs of panels 30 and 31 are bodily removable edgewise from between the upper and lower plates 12 and 20 by merely sliding the same from between the rails 32 and 33 and the frame 26—27—28. When the panels 30 and 31 are in place, the interior of each separator unit 11 is entirely enclosed, and when the panels are removed or partly removed, access may be had to the interiors of the separator units when necessary. When the bolts 29 are fully tightened, the panels 30 and 31 are held rigidly in place, but when the bolts 29 are slightly loosened, the panels are readily slidable.

Each unit 11 further comprises pairs of removable rectangular horizontal valve plates 34 corresponding in number to the openings 21 and arranged directly beneath these openings for covering or partly covering the same. Each pair of valve plates 34 operates in opposition transversely of its unit 11 and longitudinally of the flume or trough 10. The coacting pairs of valve plates 34 are slidably supported upon guides 35, dependingly rigidly secured by welding or the like to the bottom of each plate 20 and extending transversely thereof in parallel equidistantly spaced relation, as shown. The valves plates 34 of each opposed pair are thus adapted to have their inner opposed edges 36 positioned in spaced apart relation the desired amount to define variable openings or slots 37 directly beneath the openings 21, through which the various sizes of crushed aggregates may pass. The tops of the valve plates 34 preferably slidably contact the bottoms of the plates 20.

For the purpose of accurately adjusting or sliding the individual valve plates 34 upon their guides 35, the outer end of each valve plate is provided with a cylindrical stud 38, rigidly secured thereto, and carrying a freely slidable longitudinally shiftable impact sleeve 39 or element to be grasped by the operator and reciprocated between the valve plate 34 and a head 40 formed upon the outer end of the stud 38. The valve plates 34 may thus be finally adjusted inwardly or outwardly by the use of the impact sleeves 39 to adjust the widths of the slots 37 as desired. As shown in Figure 8, for example, the right hand slot 37 is of a size to permit the passage of relatively rough or large aggregate therethrough, while the left hand slot 37 is of a size to allow only the passage of sand therethrough, and the intermediate slot 37 will permit the waste material or sludge to pass therethrough.

Bars or plates 41 are rigidly secured by welding to the bottoms of the guides 35 for providing ledges 42 between the pairs of guides for the support of depending open ended discharge spouts or tubes 43 in each unit 11. The spouts 43 are provided at their top ends with rectangular head plates 44 rigidly secured thereto, and slidable upon the ledges 42 and supported thereby, as shown. The discharge spouts 43 have their tops disposed close to the bottoms of the valve plates 34 and preferably slidably contacting the same, and the bores of the spouts 43 directly underlie the adjustable passages or slots 37 between the pairs of valve plates. The depending spouts 43 upon receiving the properly separated or graduated aggregates from the slots 37 convey the same downwardly for discharge into suitable chutes 45 where the aggregates are conducted to desired points of piling or storage. Attention is directed to the fact that the valve plates 34 as well as the spouts 43 are bodily removable by sliding from the guides 35 and ledges 42 respectively. Thus, when the inner opposed edges 36 of the valve plates become worn by abrasion, the valve plates may be withdrawn and inverted so as to present sharp edges 36 for again accurately defining the slots 37. Likewise, all of the liners 18 may be inverted when the margins of the openings 19 become worn due to excessive abrasion upon one side of the liner. This facilitates prolonging the life of the liners 18 and valve plates 34 before replacement of the same.

When it is necessary to replace the various liners 18, it is not necessary to dismantle the entire unit 11. The liners 18 on the lower plates 20 may be removed by first sliding out and removing the spouts 43 and valve plates 34. The operator may then reach upwardly between the guides 35 and lift out the liners 18 from their sockets above the plate 20. The liners 18 are first elevated from their sockets and then arranged diagonally of the openings 21 as indicated diagrammatically in broken lines in Figure 8. In this position, the liners 18 may be readily withdrawn downwardly through the openings 21 for replacement by new liners. To facilitate the passage of the liners 18 through the openings 21 and 15, the corners of the liners may be bevelled as indicated at 46, Figure 5. The liners 18 upon the upper plates 12 may likewise be elevated from below the openings 15 and arranged diagonally and withdrawn downwardly through the openings 15 for replacement, without dismantling the unit 11, save for slightly loosening the bolts 29 and sliding back one or more of the panels 30 or 31. The valve plates 34 may be bodily removed and replaced at any time without touching other parts of the apparatus.

Initial placement of the various liners 18 within their sockets can of course be accomplished prior to tightening the bolts 29 and positioning the closure panels 30 and 31 as the apparatus is set up.

It should be noted that the lower ends of the discharge tubes 43 are at an elevation with respect to the chutes 45, whereby the operator may extend his hand beneath the tubes and determine by feel the size and quality of the material passing therethrough. This enables the operator to know how to adjust the valve plates 34 for regulating the slots 37.

The general operation of the apparatus is as follows: With the separator units 11 assembled as above described, the mixture or slurry of ground rock and water from the crushing apparatus flows longitudinally through the flume 10 and over the openings 19 of the liners 18 upon the upper plates 12. At each unit 11, quantities of the slurry will pass downwardly through the openings of the upper liners 18 and the chamber of each unit 11 formed by the panels 30 and 31 will become filled with the slurry. It may be mentioned here that the waste sludge portion of the mixture or slurry upon initial passage through the apparatus sufficiently seals all joints and cracks.

The larger aggregates or gravel will now begin to pass downwardly through the largest of the passages 37 and through the tube 43 beneath it in each unit 11. The fine sand in the slurry will likewise pass through the smallest passage 37 in each unit 11 and the waste sludge will pass through the passage 37 of intermediate size in each unit 11. The several openings or passages 37, will definitely determine the type of material that is capable of passing therethrough, and it will be clearly apparent, that since the fine sand, the slurry and the coarse aggregates are all flowing through the flume 10 and since the flow through the flume creates a turbulence in the water, the heavy aggregates will be the first to fall downwardly and of course there will be a certain quantity of fine sand and sludge also enter the first unit 11. The successive units 11 also receive the water carrying the coarse aggregates, the sludge and the sand and, as the water and its supported materials settle into the bottom of the units 11, the coarse aggregates will pass downwardly through the openings 37. It will be apparent of course that since the opening for the coarse aggregates is wider than the others, there will be a certain amount of the sludge and the fine sand also passing downwardly. The other openings 37 obviously regulate the diameter of the materials passing therethrough. The outermost opening 37 for the fine sand will regulate the grain of sand passing therethrough, to the exclusion of the sludge and the coarse aggregates. The sludge and the coarse aggregates after passing downwardly through the tube 43, flow through the chutes 45 and, the chutes 45 are directed toward their respective points of discharge. The flow through the chutes 45 also creates a turbulence in the water, causing any sludge or fine sand therein to bubble upwardly and overflow the marginal sides of the chutes. The thus separated or classified aggregates are now conveyed by the respective chutes 45 to separate storage bins, or the like.

The operator can adjust the sizes of the passages 37, as previously described, by manipulating the impact sleeves 39.

It is thus apparent that an extremely simple form of separator has been provided, whereby to separate the desirable components of crushed stone or like material in a very efficient manner. It is to be noted that no moving parts save the adjustable valve plates 34 are embodied in the apparatus, and no agitators for the slurry are needed. This is highly advantageous in that moving parts in apparatus of this type are very easily clogged or jammed by the sludge. Separators presently in use are quite complicated and difficult to adjust and to maintain when parts are worn. It is frequently necessary to completely disassemble presently used apparatus for maintenance, requiring approximately a full days time before the plant can again be placed in operation. The present invention permits of instant adjustment of the valve plates 34 at any time during the operation of the apparatus and replacement or inversion of the wear exposed liners 18 in a minimum of time without disassembly of the apparatus, as previously explained. Additionally, while one of the separator units 11 is being serviced, the other units 11 are not affected in any way.

It is to be understood that the form of the invention, herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. Separator apparatus comprising a trough to convey a liquid slurry embodying solid components to be separated and having an opening in its bottom, a boxlike structure secured to the bottom of the trough adjacent said opening and having top, bottom and side walls, said top wall having opening means communicating with the interior of said trough for conducting a quantity of the slurry into the boxlike structure, said bottom wall having a plurality of opening means, guide means dependingly secured to said bottom wall, adjustable slide valve elements engaging said guide means and disposed below the opening means of the bottom wall for defining variable outlet passages for different sizes of solid components and communicating with the opening means of the bottom wall, and means associated with the bottom of the boxlike structure below the slide valve elements for conveying the sized separated components to separate points of storage.

2. A separator apparatus comprising a trough-like member to convey a liquid slurry embodying various sizes of solid components and having an opening in its bottom, a boxlike unit dependingly secured to the bottom of the trough-like member adjacent said opening and having top, bottom and side walls, said top wall having an opening communicating with said opening of the trough-like member, means forming a socket upon the upper side of said top wall adjacent the opening of the top wall, a readily removable liner plate disposed within said socket and having an opening in registry with the opening of the top wall, said bottom wall having a plurality of openings formed therethrough, means forming sockets upon the top of said bottom wall adjacent the openings of the bottom wall, readily removable liner plates disposed within the last-named sockets and having openings in registry with the openings of the bottom wall, and adjustable valve means secured to said bottom wall beneath the openings of the bottom wall for forming variable discharge passages in communication with the openings of the bottom wall for selected sizes of solid components of the slurry.

3. Separator apparatus comprising a boxlike unit having top, bottom and side walls, means secured to and dependingly supporting the boxlike unit and adapted to convey a liquid slurry containing solid components to the boxlike unit, said top wall of the boxlike unit having opening means communicating with said conveying means, said bottom wall of the boxlike unit having a plurality of opening means, a plurality of guides dependingly secured to said bottom wall, a plurality of cooperating pairs of adjustable valve plates slidably engaging said guides and arranged below the opening means of the bottom wall and adapted to form variable slots communicating with the opening means of the bottom wall, and a plurality of depending discharge spouts arranged below the pairs of valve plates and engaging said guides and supported thereby.

4. Separator apparatus comprising a trough-like member having an opening in its bottom, an upper plate secured to the bottom of the trough-like member adjacent said opening and having opening means communicating with the interior of the trough-like member, a lower plate having a plurality of opening means, an upstanding frame secured to said lower plate outwardly of the opening means of the lower plate and adapted to have its top abut the bottom of said upper plate, side panels slidably engaging the outer sides of said frame and being removable, guide rails secured to the bottom and top respectively of the upper and lower plates outwardly of said side panels and slidably contacting the side panels, bolt means extending between and connecting the upper and lower plates outwardly of said side panels and holding the top of the frame in contact with said upper plate, and adjustable valve means carried by the lower plate below said opening means of the lower plate to regulate the passage of different size solid particles through the opening means of the lower plate.

5. Separator apparatus comprising a trough-like member having a plurality of spaced openings in its bottom, a plurality of box-like units secured to the bottom of the trough-like member adjacent said openings and including top, bottom and side walls, said top walls having opening means communicating with the interior of the trough-like member, each of said bottom walls having a plurality of opening means communicating with the interior of the box-like unit, and a plurality of adjustable valve means carried by each bottom wall below the opening means of the bottom wall for regulating the passage of different size, solid components through the opening means of the bottom wall.

6. Separator apparatus according to claim 5 wherein each adjustable valve means is a pair of opposed shiftable valve plates adapted to form between them a variable passage, and guide means dependingly secured to each of said bottom walls and slidably supporting the pairs of valve plates.

7. Separator apparatus according to claim 5 wherein each adjustable valve means is a pair of opposed shiftable valve plates adapted to form between them a variable passage, guide means dependingly secured to each bottom wall and slidably supporting the pairs of valve plates, and a plurality of discharge spouts dependingly secured to the guide means of each bottom wall below the pairs of valve plates and corresponding in number to the pairs.

8. Separator apparatus according to claim 3, and a reciprocatory impact element connected with each valve plate for the use of an operator in finely adjusting the pairs of valve plates.

9. Separator apparatus according to claim 3, studs secured to corresponding ends of the valve plates in each pair and having heads, and impact sleeves slidably mounted upon the studs between the adjacent ends of the valve plates and said heads.

10. Separator apparatus according to claim 3, wherein each discharge spout includes a flanged upper end slidably engaging said guides below said valve plates.

11. Separator apparatus comprising a trough-like member having an opening in its bottom, an upper plate secured to said bottom adjacent said opening and having an opening communicating with the interior of the trough-like member, a liner plate removably mounted upon the top of the upper plate adjacent the opening of the upper plate and having a reduced opening leading to the opening of the upper plate, a lower plate having a plurality of openings formed therethrough, a plurality of liner plates removably mounted upon the top of said lower plate adjacent the openings of the lower plate and having reduced openings leading to the openings of the lower plate, an upstanding frame secured to the lower plate and surrounding the openings of the lower plate and the liner plates, upstanding side panels slidably engaging the outer sides of said frame, guide means secured to the upper and lower plates for engagement with the outer sides of the side panels, bolts extending between and connecting the upper and lower plates outwardly of the side panels and holding the top of the frame in abutting engagement with the bottom of the upper plate, guide means dependingly secured to the bottom of the lower plate on opposite sides of the openings of the lower plate, pairs of opposed slide valve plates slidably engaging and supported by the last-named guide means and arranged below said openings of the lower plate, each pair of slide valve plates adapted to form a variable discharge passage between their opposed ends, and a plurality of discharge tubes dependingly connected with the last-named guide means below said pairs of slide valve plates.

No references cited.